US012392175B2

(12) United States Patent
Gröver

(10) Patent No.: US 12,392,175 B2
(45) Date of Patent: Aug. 19, 2025

(54) ELECTRIC DOOR HANDLE FOR A VEHICLE DOOR

(71) Applicant: HS Products Engineering GmbH, Maisach (DE)

(72) Inventor: Niklas Christopher Gröver, Munich (DE)

(73) Assignee: HS Products Engineering GmbH, Maisach (DE)

( * ) Notice: Subject to any disclaimer, the term of this patent is extended or adjusted under 35 U.S.C. 154(b) by 355 days.

(21) Appl. No.: 17/749,182

(22) Filed: May 20, 2022

(65) Prior Publication Data

US 2022/0403684 A1 Dec. 22, 2022

(30) Foreign Application Priority Data

May 20, 2021 (DE) ..................... 10 2021 205 153.7

(51) Int. Cl.
*E05B 85/10* (2014.01)
*E05B 81/76* (2014.01)

(52) U.S. Cl.
CPC .................................. *E05B 85/107* (2013.01)

(58) Field of Classification Search
CPC ....... E05B 85/10; E05B 85/103; E05B 85/107
See application file for complete search history.

(56) References Cited

U.S. PATENT DOCUMENTS 6,609,737 B2 * 8/2003 Fisher ..................... E05B 81/48 292/201
8,701,353 B2 * 4/2014 Patel ..................... E05B 85/103 292/201
8,786,401 B2 * 7/2014 Sobecki .................. E05B 81/34 340/5.1
10,435,924 B1 * 10/2019 Salter ...................... E05B 81/78
10,435,926 B2 * 10/2019 Brown .................. E05B 85/103
10,487,547 B2 * 11/2019 Malvy ..................... E05B 81/06
10,783,407 B2 * 9/2020 Ciripanga ............... G06F 18/25
(Continued)

FOREIGN PATENT DOCUMENTS

DE 19860229 7/2000
DE 19860229 A1 * 7/2000 ............. E05B 81/28
(Continued)

*Primary Examiner* — Carlos Lugo
(74) *Attorney, Agent, or Firm* — Nixon Peabody LLP

(57) ABSTRACT

The present invention relates to an electric door handle (10) for a vehicle door, comprising a main body (20) for arrangement in the vehicle door, wherein a hand grip (30) is mounted on the main body (20) so as to be movable within a range of movement (BB) between a mechanically defined first end position (EP1) and a mechanically defined second end position (EP2) by means of a handle bearing (32), further comprising an electric drive (40) for a movement of the hand grip (30) between the two end positions (EP1, EP2) and at least one sensor means (50) for determining the position of the hand grip (30) between the two end positions (EP1, EP2), wherein the electric drive (40) comprises a transmission device (42) for load-free positioning of the hand grip (30) in a gripping position (GP) of the hand grip (30) at a distance from the end positions (EP1, EP2) and for load-free positioning of the hand grip (30) in a travel position (FP) at a distance from the end positions (EP1, EP2) and from the gripping position (GP).

16 Claims, 6 Drawing Sheets

(56) References Cited

U.S. PATENT DOCUMENTS

| | | | | |
|---|---|---|---|---|
| 10,815,702 | B2 * | 10/2020 | Yoshino | E05B 85/103 |
| 11,248,403 | B2 * | 2/2022 | Boberschmidt | E05B 85/103 |
| 2017/0089102 | A1 | 3/2017 | Yoshino | |
| 2019/0112846 | A1 * | 4/2019 | Laval | E05B 85/107 |

FOREIGN PATENT DOCUMENTS

| | | | | |
|---|---|---|---|---|
| DE | 10340792 | | 4/2005 | |
| DE | 102010056437 | A1 * | 6/2012 | E05B 77/06 |
| DE | 102015010923 | A1 * | 3/2016 | B60Q 1/00 |
| DE | 102015113903 | | 2/2017 | |
| DE | 102015011468 | A1 * | 3/2017 | |
| DE | 102019007216 | | 4/2021 | |
| DE | 102019007216 | A1 * | 4/2021 | E05B 77/04 |
| EP | 3498953 | A1 * | 6/2019 | E05B 77/42 |
| GB | 2548146 | | 9/2017 | |
| WO | WO 2018/050493 | | 3/2018 | |
| WO | WO-2018050493 | A1 * | 3/2018 | E05B 81/06 |

* cited by examiner

ELECTRIC DOOR HANDLE FOR A VEHICLE DOOR

RELATED APPLICATION

This application claims the benefit of priority under of Germany Patent Application No. 10 2021 205 153.7 filed on May 20, 2021, the contents of which are incorporated by reference as if fully set forth herein in their entirety.

FIELD AND BACKGROUND OF THE INVENTION

The present invention relates to an electric door handle for a vehicle door, to a control method for a controlled movement of an electric door handle of this kind and to a calibration method for calibrating an electric door handle of this kind.

It is known that vehicles may also be equipped with electric door handles as an alternative to mechanical door handles. For example, vehicles are known in which the door handles can be moved electrically between a retracted position for driving operation of the vehicle and an extended position for opening the door. The feature common to these known electric door handles is that they comprise mechanical opening kinematics in order, in the extended position, to be able to transfer an activation force to an opening mechanism for unlocking the corresponding vehicle door. This makes it possible for the user of the door handle to grip said door handle in the gripping position of known electric door handles of this kind, to pull said door handle out and to thereby perform a mechanical unlocking procedure.

A disadvantage of the known solutions is that a significant amount of design work is required in order to be able to provide the mechanical correlation between the unlocking on the one hand and the movement of the electric door handle for activating said unlocking on the other hand. Furthermore, the mechanical characteristics when performing the unlocking procedure are specific to the mechanism used. Variation of the characteristics, in particular of the force curve, is not possible in the known solutions.

An object of the present invention is to overcome the above-described disadvantages at least in part. In particular, an object of the present invention is to ensure adjustability that is as free as possible for an electric door handle for a vehicle door in a simple and cost-effective manner.

SUMMARY OF THE INVENTION

The above-mentioned object is solved by an electric door handle having the features of claim 1, a control method having the features of claim 8 and a calibration method having the features of claim 15. Other features and details of the invention are apparent from the dependent claims, the description and the drawings. In this regard, features and details that are described in connection with the electric door handle according to the invention naturally also apply in connection with the control method according to the invention and the calibration method according to the invention and vice versa in each case, and therefore reference is or can always be made interchangeably to the disclosure of the individual aspects of the invention.

According to the invention, an electric door handle for a vehicle door is proposed, which door handle is equipped with a main body for arrangement in the vehicle door. A hand grip is mounted on the main body so as to be movable within a range of movement, wherein the range of movement extends between a mechanically defined first end position and a mechanically defined second end position and the movability is ensured by means of a handle bearing. Furthermore, the electric door handle comprises an electric drive for a movement of the hand grip between the two end positions. The position of the hand grip between the two end positions can be determined by means of at least one sensor means. The electric drive is equipped with a transmission device for load-free positioning of the hand grip in a gripping position of the hand grip at a distance from the end positions and for load-free positioning of the hand grip in a travel position at a distance from the end positions and at a distance from the gripping position.

An electric door handle according to the invention is based on the core idea that the electric door handle is designed for an electrically performed movement. In particular, a distinction should be made between two functional positions. Firstly, there is the travel position, i.e. the position in which the hand grip is arranged when the vehicle is in a state of travel. Secondly, there is the gripping position, in which a user of the electric door handle can grip the hand grip and then open the door. In the simplest case, this is passive gripping, wherein the action of pulling results in an opening movement of the vehicle door. However, as will be explained in more detail below, the gripping may also be an active gripping, in order to trigger and/or perform an unlocking procedure of the vehicle door prior to the opening movement of the vehicle door.

The possible movements of the hand grip extend between the first end position and the second end position, which are mechanically defined and, for example, may comprise the other stops explained in more detail below.

A core idea of the invention is that at least two of the described functional positions, namely the travel position on the one hand and the gripping position on the other hand, can be set in a load-free manner by means of an electric drive via the transmission device. In other words, the electric drive alone and, in particular, independently of additional mechanical components, can position the hand grip in the travel position and in the gripping position. The only force that acts on the hand grip in the travel position and gripping position is a holding force of the electric drive, which holds the hand grip in the corresponding functional position. In contrast to known solutions, no separate switching elements, mechanical elements or kinematic lever elements are required here in order to assume and hold these positions.

A variety of advantages are achieved due to the fact that the hand grip can now be positioned at least in the functional positions of the travel position and the gripping position solely using the electric drive via the transmission device.

A first advantage is that the choice of position can be provided substantially as desired on account of the load-free nature of the positioning. As such, a different travel position and/or a different gripping position can be moved to, for example, for different vehicles, different users of the vehicle and for different vehicle doors. The free selectability therefore makes it possible to customise an electric door handle of this kind or to use said door handle as a superordinate structural module for a variety of different vehicles and then to specify and/or calibrate said door handle in a controlled manner. It is therefore possible to provide a compact modular component as an electric door handle that can be used in a customised manner in different vehicles.

Another significant advantage provided by the load-free positioning is that a mechanical correlation is no longer required for the opening mechanism and/or the unlocking mechanism of the vehicle door. Rather, it is sufficient if the door is unlocked and/or opened by a separate, in particular purely electrically operated, opening and/or unlocking mechanism. The opening and/or unlocking is then triggered if the at least one sensor means determines that the hand grip is positioned in a manner relevant for the unlocking request or the opening request. In addition to a higher degree of variability and flexibility for the use of the electric door handle, the electric door handle can also be integrated in a vehicle so as to be smaller, in a simpler manner and thus more cost-effectively on account of the fact that a mechanical correlation or additional microswitches are dispensed with.

Finally, it should also be noted that different profiles in the movement characteristics of the electric door handle can also be set by means of an electric door handle according to the invention. In particular, if counterforces are to be applied by the electric drive to the hand grip during an activation movement for unlocking the door handle, they can be set substantially as desired. For example, the user can move the hand grip out of the gripping position and into an unlocking position in order to unlock a vehicle door. For this movement, the user introduces an activation force into the hand grip. The electric drive can then apply a counterforce in a variable and freely adjustable manner such that the ease and/or heaviness of this movement can be set substantially as desired. If the vehicle on which the electric door handle is fitted is a large SUV, for example, a heavy characteristic for this movement and, accordingly, a high counterforce may be desired in order to suit the vehicle. If the vehicle is a compact vehicle, for example, a lower counterforce is possible, again to match the specific vehicle type, which lower counterforce is perceived by the user as a slick movement of the hand grip from the gripping position into the unlocking position.

As is apparent from the explanation given above, the electric door handle is designed so as to be free from a mechanically defined zero position and can in particular be positioned in the above-mentioned two—or even more—functional positions in a load-free manner. As a result, a variety of different customisations are possible, as will be explained in more detail below using details relating to the embodiments. The mechanical limits for these freedoms of movement are specified by the two mechanically defined end positions.

The driving takes place, for example, using a DC motor, and may in particular include a pivoting movement between the end positions. In particular, the entire embodiment of the electric door handle is designed to be free from a closing mechanism and/or free from an unlocking mechanism, as well as free from a microswitch, in particular. The sensor means described for determining the position of the hand grip may, for example, be an angle sensor, an absolute position sensor and/or a relative position sensor, which provides a corresponding physical and/or electrical detection functionality depending on the actual use situation.

It may be advantageous if, in an electric door handle, the handle bearing is designed to be free from a mechanical support in the travel position and/or gripping position and/or free from a lever mechanism. This further enhances the possibility of load-free positioning and reduces the outlay, design complexity and required installation space for the electric door handle. As a result, mechanical stops as well as friction between mechanically cooperating levers of a lever mechanism for intermediate positions are avoided, in particular.

It is also advantageous if, in an electric door handle of the present invention, the main body comprises a handle recess, wherein the first end position is arranged inside the handle recess and the second end position is arranged outside the handle recess. The hand grip may therefore be moved into the handle recess and out of the handle recess. In this case, too, this is a pivoting movement, in particular, wherein the pivot axis for this pivoting movement is preferably arranged outside the handle recess and inside the main body. This large range of movement results in a large number of independent load-free functional positions for the hand grip which will be explained in more detail below.

It is also advantageous if, in an electric door handle according to the invention, the sensor means is integrated in the electric drive. In particular, said sensor means may be an angle sensor which, for example in the case of an electric drive, may in particular be provided in the form of an electric stepper motor. Integrating the at least one sensor means in the electric drive makes it possible to design the remainder of the electric door handle so as to be free or substantially free from sensor means. This concentrates the required complexity on the electric drive and enhances the advantages—already explained multiple times above—of the compact and lightweight design and of the cost-effective manufacturing possibilities.

It is also advantageous if, in an electric door handle according to the invention, the main body comprises a first stop for the first end position and/or a second stop for the second end position. These are preferably mechanical stops which provide surface contact with a corresponding countersurface of the transmission device and/or of the hand grip. Preferably, however, these stops are not reached during normal operation, since positioning of the hand grip in the end positions is prevented by the corresponding counterforces and reset possibilities of the electric drive. The stops may preferably provide protection against undesired damage, in particular when violent force is applied to the hand grip, and/or to provide safety in the event of failure of the electric drive.

It is also advantageous if, in an electric door handle according to the invention, the electric drive comprises the transmission device for additional load-free positioning in at least one of the following positions that are at a distance from the end positions:

an unlocking position between the gripping position and the second end position, an indicative position, a defensive position against mechanical loading of the hand grip, a protective position between the travel position and the first end position.

The list given above is not exhaustive. In particular, the individual positions are correlated with a first end position inside a handle recess and a second end position outside a handle recess of the main body. The unlocking position constitutes the end of an unlocking movement of the hand grip out of the gripping position, as will be explained in greater detail below. In its positioning, the unlocking position performs a signalling function, which, for example, indicates to an unlocking mechanism that it should unlock the vehicle door in an electrical manner. An indicative position allows for communication between the user of the electric door handle and the vehicle. For example, visualisation may take place in that the hand grip is moved by the electric drive into an indicative position. This makes it possible, for example, to indicate that the vehicle is not yet locked or another functional situation has or has not yet occurred. For example, it is possible for the indicative position to inform the driver that a light situation at the vehicle, a locking function or the like has or has not been achieved. Conversely, it is also possible for signalling to be provided to the vehicle in the opposite direction by means of a movement of the user of the electric door handle, for example by means of the user pushing the hand grip along the range of movement. For example, the door handle being pushed multiple times may be used as an output signal to lock the vehicle. Separate sensors, such as touch-sensitive elements in the region of the door handle, can be avoided in this way, such that an additional signalling functionality can be integrated in the electric door handle without additional design effort. A defensive position may, for example, provide defence against mechanical loading. For example, if a person is leaning on the vehicle against the hand grip, said hand grip can be moved into a defensive position, which is perceived, in particular, as a tapping movement on the body part leaning on the hand grip. Finally, a protective position is also possible, which can be produced by retracting into a handle recess between the travel position and the end position. For example, if the vehicle is in a crash situation or pre-crash situation, protective position can increase the probability that the hand grip is not ripped off or otherwise damaged during the crash.

Additional advantages can be achieved if, in an electric door handle according to the present invention, the transmission device and the handle bearing form a pivot axis for a pivoting movement of the hand grip over at least part of the range of movement, in particular over the entire or substantially the entire range of movement. Said pivot axis preferably lies within the main body and outside a handle recess. The pivoting movement allows for a particularly compact design and may additionally or alternatively be combined with a translational movement.

Another object of the present invention is a control method for a controlled movement of a hand grip of an electric door handle according to the invention, comprising the following steps:

- ascertaining the current position of the hand grip within the range of movement,
- determining a target position of the hand grip within the range of movement,
- moving the hand grip into the target position within the range of movement by applying a movement force by means of the electric drive,
- holding the hand grip in the target position reached with a holding force by means of the electric drive.

A control method according to the invention brings the same advantages as those explained in detail with reference to an electric door handle. The current position of the hand grip is ascertained, in particular, using the sensor means. The target position may, for example, be determined by means of a specification of a control system of the vehicle. For example, the hand grip may be in a travel position while the user of the vehicle is approaching the vehicle. The target position may be determined as the gripping position in a control method according to the invention if an action of the user of the vehicle is detected or if it is detected that the user is merely approaching with a key in their pocket. Subsequently, the hand grip is moved into said target position, for example in the form of the gripping position. For this movement, the electric drive applies the correspondingly required movement force to the hand grip. As soon as the hand grip has reached the target position, said position is only stable as load-free positioning as long as the electric drive is applying the correspondingly required holding force. Here, again, it is readily apparent how freely variable both the positioning and the application of force are in the relevant target position of the hand grip designed as a functional position.

It is advantageous if, in a control method according to the invention, when an externally applied activation force is detected for moving the hand grip out of the target position, in particular in the form of the gripping position, a defined counterforce is generated by means of the electric drive counter to the activation force. For example, it is possible that the hand grip is gripped by the user and moved into an unlocking position. The defined counterforce is therefore a defined resistance to said movement, which can be perceived by the user as a lightness or heaviness of the hand grip. In other words, it becomes possible to set the force characteristics during movement of the hand grip in a variable manner and, in particular, to reproduce different mechanical characteristics by applying different counterforce curves of the electric drive. The counterforce and thus the characteristics during movement of the door handle is therefore designed to be freely adjustable.

Additional advantages can be achieved if, in a control method according to the invention, the counterforce is lower than the activation force over part of the movement of the hand grip so as to allow for the defined movement of the hand grip. This therefore makes it possible to generate a resulting force that permits the desired movement, in particular in consideration of a maximum permitted movement speed. In this case, too, it is again possible to set and electronically control force characteristics and/or movement characteristics. Of course, it is possible for the counterforce to not be constant, but rather be provided so as to be variable along a curve in order, for example, to electronically reproduce a mechanical clicking sensation of mechanical unlocking kinematics via an increase.

Additional advantages can be achieved if, in a control method according to the invention, the movement force, the holding force and/or, in particular, a counterforce is adapted specifically for at least one of the following usage variants:

- type of the vehicle,
- make of the vehicle,
- position of the vehicle door,
- benefits to the person.

The list given above is not exhaustive. For example, door handles of varying degrees of heaviness can be imitated for different types of vehicle. A door handle for an SUV can thus be provided with heavier characteristics by means of the electric drive, whereas a compact car is provided with lighter characteristics by the same electric drive. Here, it is possible to use the same electric door handle without this design identity becoming apparent during use. Furthermore, different characteristics can be set for the electric door handle for different manufacturers of the vehicle, and thus different makes. It is also possible to provide different characteristics for different vehicle doors on one and the same vehicle. For example, if child seats are mounted on the back seats, the electric door handle on the associated rear vehicle doors can be designed to be more lightweight than on the front vehicle doors for the parents. In addition, an adaptation and thus customisation can be provided for different users, who are identifiable, for example, by keys of the vehicle assigned to persons.

Additional advantages can be achieved if, in a control method according to the invention, the curve of the activation force and/or the curve of the pulling speed of the hand grip is ascertained throughout the movement of the hand grip under the action of the activation force. This thus produces a live measurement and/or real-time measurement that can be coupled back into the control method. It is therefore possible to adapt to the current situation in a simple and cost-effective manner, such that, in particular, mechanical damage can be prevented and/or an undesired end position can be prevented from being reached in a highly effective manner.

It is also advantageous if, in a control method according to the invention, a movement duration is ascertained, in particular for the movement from the current position of the hand grip into the target position of the hand grip. The movement duration may therefore be monitored and preferably compared with a predefined maximum movement duration. If, for example, the movement from the gripping position into the travel position is too slow, this may be associated with a trapping situation. This makes it possible to detect such a situation without additional trapping sensors and thus to provide the required safeguard against trapping. In addition, if, for example, movement is too slow in the extension direction, it can be established that there may possibly be an icing situation, which can be countered with a defined de-icing movement of the electric door handle.

Additional advantages can be achieved if, in a control method according to the invention, a crash situation and/or a pre-crash situation is detected and a crash position and/or a pre-crash position is moved to as the target position for the hand grip. In particular, a distinction is made between pre-crash and crash, such that, in the pre-crash situation, a protective position can be assumed and then maintained throughout the crash situation to prevent the hand grip from being ripped off or damaged. At the end of the crash, the hand grips may automatically be extended into a gripping position in order, for example, to make it easier for rescue workers rushing to the scene to gain access into the vehicle. It is also possible for different protective positions to be assumed for the different doors, in order to further increase the probability of accessibility being as easy as possible.

It is also advantageous if, in a control method according to the invention, an indicative position is moved to as the target position in order to output a visual and/or haptic signal. Said visual and/or haptic signal may represent both the position alone as well as the movement into said position. For example, a tapping movement can be performed with the hand grip and perceived haptically by the user. In addition, an optical waving movement or movement into a defined recognisable waving position can add a signalling functionality to the control method in this case.

It is also advantageous if, in a control method according to the invention, a movement of the hand grip that is detected as a signal input is produced by introducing an activation force. As has already been explained, signalling in the opposite direction from the user to the vehicle is possible here. For example, functions of the vehicle, such as locking, activation of a parking light, opening of a boot, closing of the windows or opening or closing of other doors, can be signalled here as a function request. It may additionally be possible for the electric drive to operate as a generator in order to be able to provide the functionality described even in a de-energised situation, for example in cooperation with an electrical capacitor.

Another object of the present invention is a calibration method for calibrating an electric door handle according to the invention for use in a control method according to the invention, comprising the following steps:

- detecting a position signal of a current position of the hand grip,
- determining a current position of the hand grip in relation to at least one of the two end positions,
- relating the current position signal to the determined current position of the hand grip.

As such, a calibration method according to the invention brings the same advantages as those described in detail in relation to an electric hand grip according to the invention and a control method according to the invention. The position to be detected can also be actively moved to. In the simplest case, this position may be one or even both of the end positions. However, it is also possible to deliberately move to a calibration position, which lies between the end positions and can be verified by means of separate checking means. The desired calibrated position is preferably as flush as possible with the outside of the vehicle skin of the vehicle, for example in the travel position.

A calibration method of this kind can be further developed in that the current position is determined in at least one of the following ways:

- using a checking means for immobilising the hand grip,
- camera images, in particular from a camera device fixed to the vehicle.

The list given above is not exhaustive. For example, checking means can be used which ensure a defined, flush positioning of the hand grip with the outer skin of the vehicle. For example, an adhesive tape may be guided over the hand grip such that a temporary end position is specified for this calibration situation in a mechanically defined manner. In addition, camera images may be evaluated in order to establish, during a service run from the first end position towards the second end position, when a flush orientation with the outer skin of the vehicle is possible and thus when the travel position can be set.

BRIEF DESCRIPTION OF THE SEVERAL VIEWS OF THE DRAWINGS

Additional advantages, features and details of the invention are apparent from the following description, in which exemplary embodiments of the invention are described in detail with reference to the drawings. The features mentioned in the claims and in the description may be essential to the invention individually or in any combination. In the schematic drawings:

DESCRIPTION OF SPECIFIC EMBODIMENTS OF THE INVENTION

Figure 1:
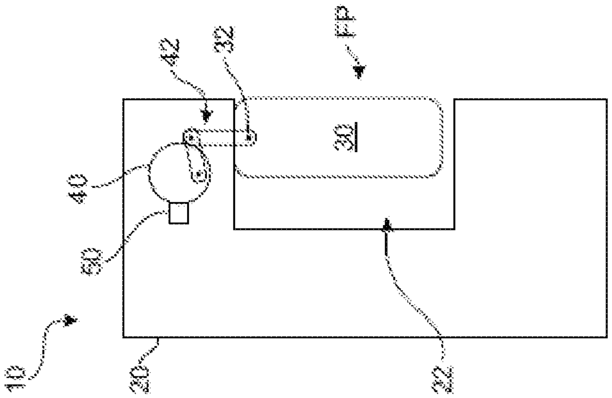
FIG. 1 shows an embodiment of an electric door handle according to the invention in the travel position.

FIG. 1 is a schematic representation of a door handle 100 that can be fitted via a main body 20 on a vehicle. A handle recess 22 in which the hand grip 30 is arranged so as to be flush with the outer skin of the vehicle in the travel position shown is formed here in the main body 20. In order for the hand grip 30 to be movable, a handle bearing 32 is coupled here to a transmission device 42, such that a movement into desired target positions for the hand grip 30 is possible by means of an electric drive 40. Here, the position detection is given by a sensor means 50, for example in the form of an angle sensor.

Figure 3:
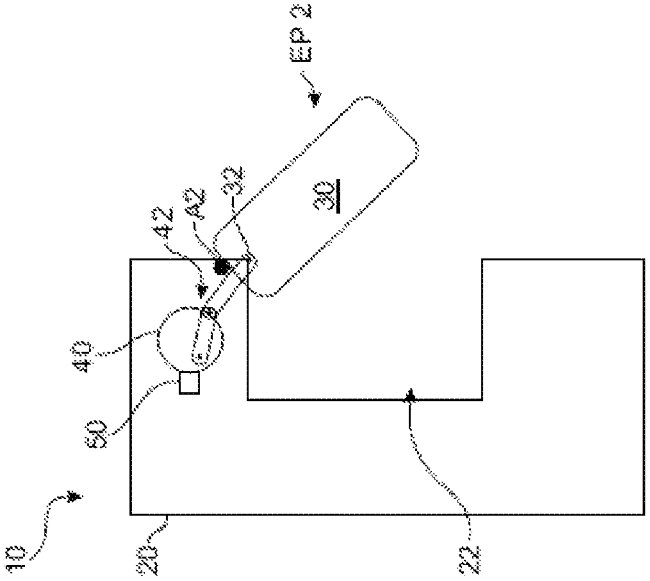
FIG. 3 shows the embodiment from FIGS. 1 and 2 in the second end position.
Figure 2:
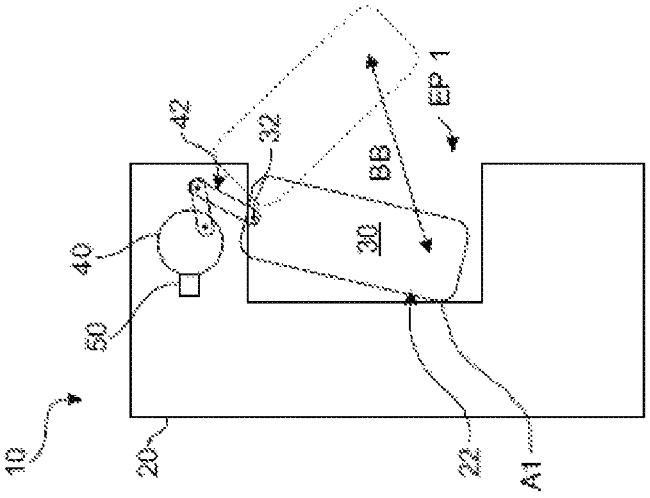
FIG. 2 shows the embodiment from FIG. 1 in the first end position.

FIGS. 2 and 3 are schematic representations of two possible end positions EP1 and EP2. FIG. 2 shows the correlation between these two end positions EP1 and EP2, which specify the maximum range of movement BB. In order to specify the end positions EP1 and EP2 in a mechanically defined manner, a first stop A1 is specified in each case for the first end position EP1 and a second stop A2 is specified in each case for the second end position EP2. During normal operation of the electric door handle 10, these two end positions EP1 and EP2 should advantageously be understood to be mechanical protection positions that are preferably never assumed or only assumed in exceptional situations.

Figure 4:
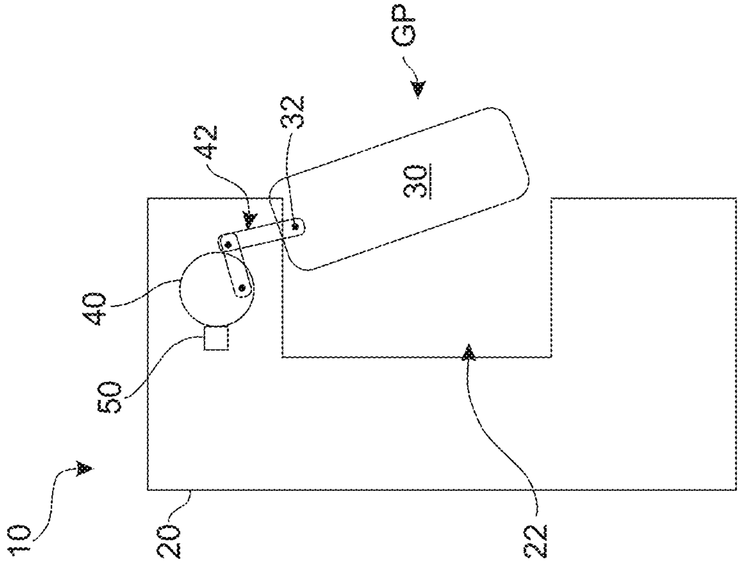
FIG. 4 shows the embodiment from FIGS. 1 to 3 in the gripping position.

FIG. 4 shows a gripping position GP, in which it is possible, for example, to reach into or under the hand grip 30. In this position, an unlocking movement can now be performed, for example by using a gripping movement to pull the hand grip 30 further out of said gripping position GP, towards the second end position EP2.

Figure 5:
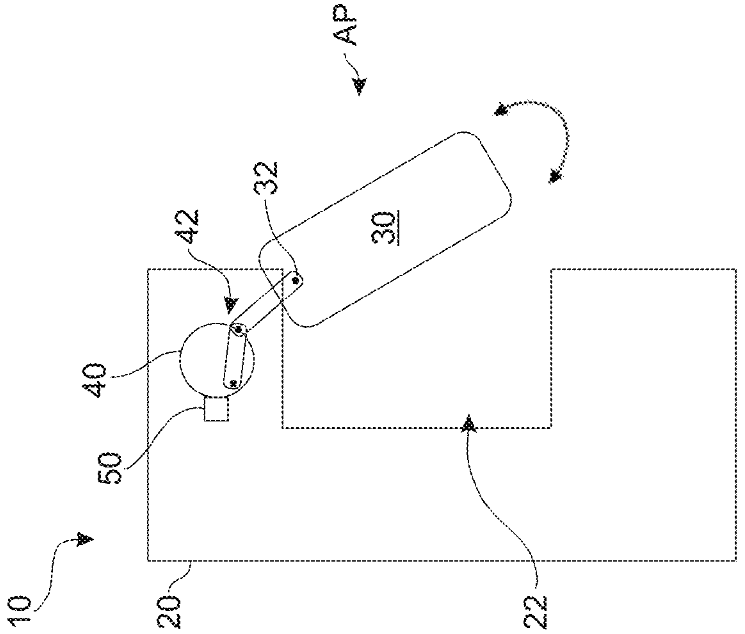
FIG. 5 shows the embodiment from FIGS. 1 to 4 in an indicative position.

FIG. 5 shows a possible indicative position AP, which can be optically distinguished from the gripping position GP. A movement into this indicative position AP can output a signal to the user of the electric door handle 10 in the form of a waving movement.

Figure 6:
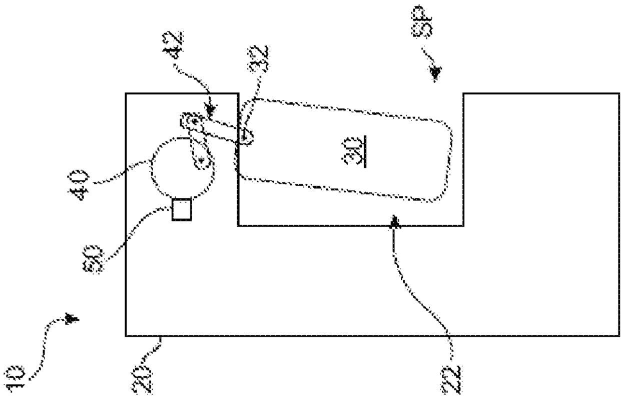
FIG. 6 shows the embodiment from FIGS. 1 to 5 in a protective position.

FIG. 6 schematically shows a protective position SP, in which the hand grip 30 is retracted further into the handle recess 22 in order to prevent undesired mechanical impairment or damage so as to be able to provide a greater protective effect.

Figure 7:
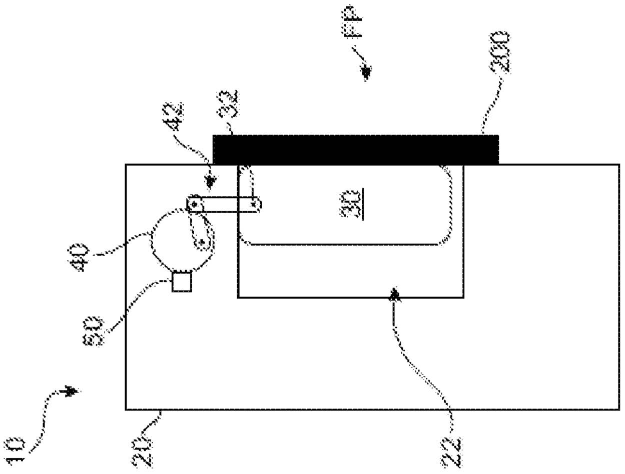
FIG. 7 shows the embodiment from FIGS. 1 to 6 in a calibration situation.

FIG. 7 shows a possibility with a checking means 200, which temporarily limits a movement of the hand grip 30 here. If the hand grip 30 is then moved towards the second end position EP2 for a calibration method, the checking means 200 sets a new, temporarily mechanically defined end position as the travel position FP. As soon as this mechanically temporarily defined end position is reached, the calibration can set this position as the travel position FP and the checking means 200 can be removed again.

Figure 8:
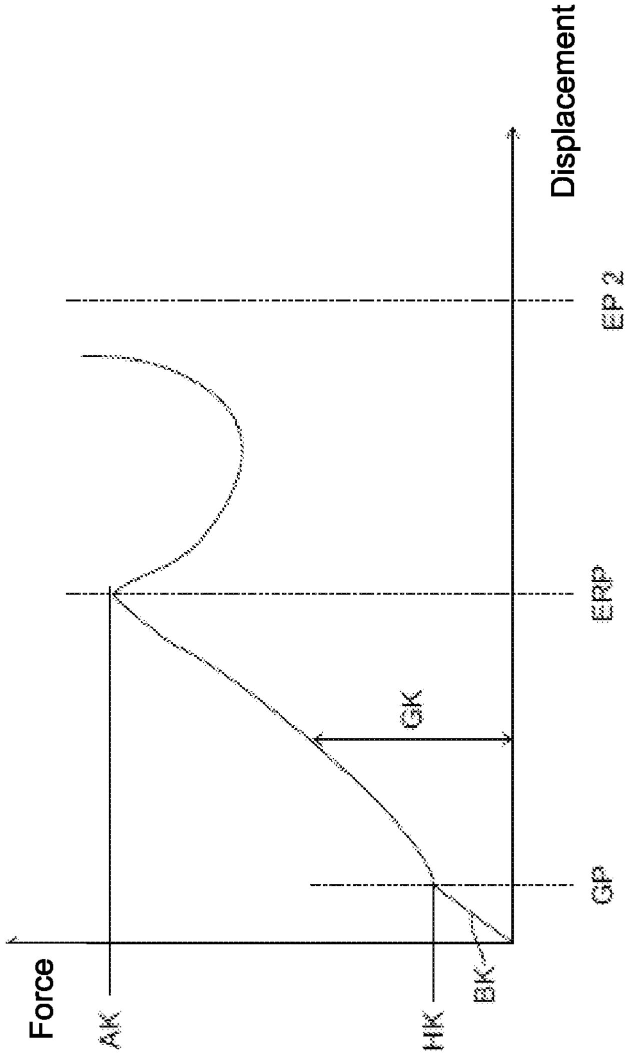
FIG. 8 shows the course of a force-displacement curve during use of an electric door handle.

FIG. 8 schematically clearly shows how freely adjustable force characteristics can, for example, be set by means of an electric door handle 10 of this kind. Proceeding from a travel position FP (not shown in FIG. 8), a movement of the hand grip 30 into the gripping position GP takes place by means of a movement force BK. The hand grip 30 is held in this position by means of the holding force HK. If the user of the electric door handle 10 then grips the hand grip 30 and pulls it further out towards an unlocking position ERP, said user thus introduces an activation force AK until unlocking is achieved. In the process, the electric drive 40 applies a counterforce GK that increases with increasing displacement to the hand grip 30 until a maximum is reached at the unlocking position ERP. Here, either the movement of the hand grip 30 is terminated or a clicking sensation is produced for the user by means of a significant reduction in the counterforce GK over the remaining displacement path. Over the remaining displacement path, it can clearly be seen that the counterforce GK increases sharply even before the second end position EP2 is reached, in order to ensure a maximum blockade effect against said second end position EP2 actually being reached by the hand grip 30.

Figure 9:
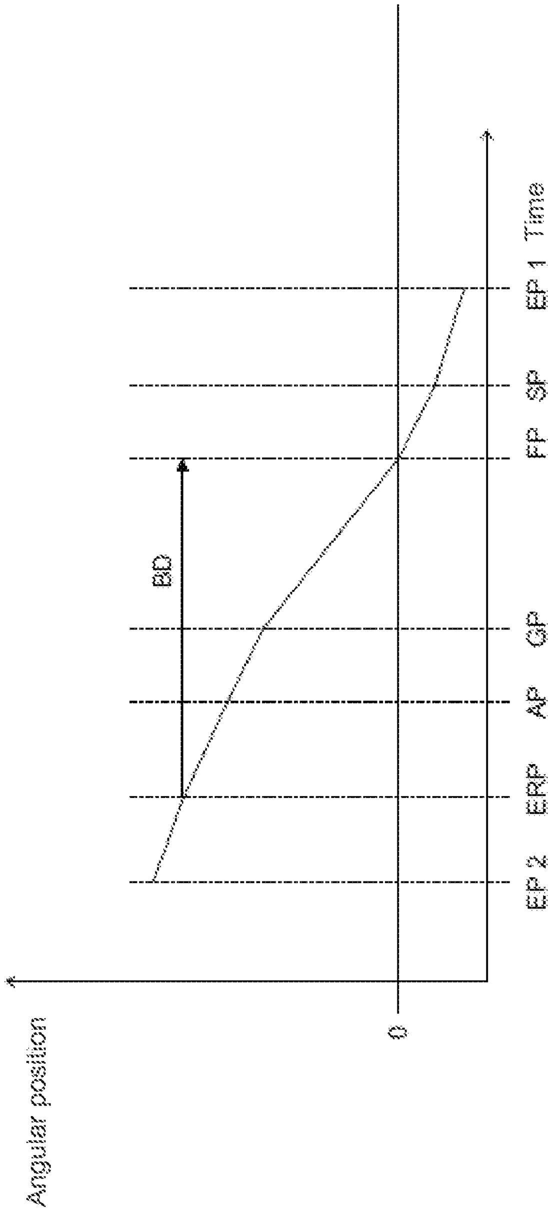
FIG. 9 shows the time curve of the individual positions in one example.

FIG. 9 is a schematic representation of how the individual angular positions can be assumed over time. For example, the travel position FP can be defined here as the zero position. In this movement, for example a service movement of the hand grip 30, the movement takes place from the second end position EP2 via an unlocking position ERP, an indicative position AP, a gripping position GP, a travel position FP and a protective position SP into the first end position EP1. Of particular importance is the range of the movement between the unlocking position ERP into the travel position FP and the movement duration BD required for this. If said movement duration is longer than a defined specification or a defined limit value, this may be due, for example, to a trapping situation, which can be detected by means of the time and position curve alone and without a separate trapping sensor.

The explanation of the embodiments given above describes the present invention exclusively within the scope of examples. Of course, individual features of the embodiments may be freely combined with one another, provided that this is technically feasible, without departing from the scope of the present invention.

REFERENCES

10 Electric door handle
20 Main body
22 Handle recess
30 Hand grip
32 Handle bearing
40 Electric drive
42 Transmission device
50 Sensor means
200 Checking means
BK Movement force
HK Holding force
AK Activation force
GK Counterforce
BD Movement duration
BB Range of movement
GP Gripping position
FP Travel position
AP Indicative position
SP Protective position
ERP Unlocking position
EP1 First end position
EP2 Second end position
A1 First stop
A2 Second stop

What is claimed is:

1. An electric door handle for a vehicle door, the electric door handle comprising:
a main body for arrangement in the vehicle door;
a hand grip mounted on the main body and configured to be movable within a range of movement between a mechanically defined first end position and a mechanically defined second end position using a handle bearing;
an electric drive configured to move the hand grip between the first end position and the second end position; and
at least one sensor for use in determining the position of the hand grip between the first end position and the second end position, wherein the electric drive comprises a transmission device for use in:

(i) positioning the hand grip in a gripping position of the hand grip at a first distance from the first end position and (ii) positioning the hand grip in a travel position at a second distance from the first end position, and wherein the transmission device is further configured to:

(i) position the hand grip in a target position located between the first end position and the second end position; and (ii) hold the hand grip in the target position with a holding force applied by the electric drive;

(iii) wherein the electric drive generates a defined counterforce counter to an externally applied activation force for moving the hand grip out of the target position.

2. The electric door handle according to claim 1, wherein the handle bearing is designed to be free from a mechanical support in the travel position and/or gripping position and/or free from a lever mechanism.

3. The electric door handle according to claim 1, wherein the main body comprises a handle recess, wherein the first end position is arranged inside the handle recess and the second end position is arranged outside the handle recess.

4. The electric door handle according to claim 1, wherein the sensor is integrated in the electric drive.

5. The electric door handle according to claim 1, wherein the main body comprises a first stop for the first end position and/or a second stop for the second end position.

6. The electric door handle according to claim 1, wherein the electric drive comprises the transmission device and at least assists in positioning the hand grip in at least one of the following positions:

an indicative position at a third distance from the first end position, a protective position between the travel position and the first end position.

7. The electric door handle according to claim 1, wherein the transmission device and the handle bearing form a pivot axis for a pivoting movement of the hand grip over at least part of the range of movement over the entire or substantially the entire range of movement.

8. A control method for a controlled movement of a hand grip of an electric door handle comprising:

a main body for arrangement in the vehicle door;

a hand grip mounted on the main body and configured to be movable within a range of movement between a mechanically defined first end position and a mechanically defined second end position using a handle bearing;

an electric drive configured to move the hand grip between the first end position and the second end position; and at least one sensor for use in determining the position of the hand grip between the first end position and the second end position, wherein the electric drive comprises a transmission device for use in:

(i) positioning the hand grip in a gripping position of the hand grip at a first distance from the first end position and (ii) positioning the hand grip in a travel position at a second distance from the first end position;

the method comprising:

ascertaining the current position of the hand grip within the range of movement, determining a target position of the hand grip within the range of movement, moving the hand grip into the target position within the range of movement by applying a movement force by means of the electric drive, holding the hand grip in the target position reached with a holding force by means of the electric drive, and generating, via the electric drive, a defined counterforce counter to an externally applied activation force for moving the hand grip out of the target position.

9. The control method according to claim 8, wherein the counterforce is lower than the activation force over part of the movement of the hand grip so as to allow for a defined movement of the hand grip.

10. The control method according to claim 8, wherein the movement force, the holding force and/or a counterforce is adapted specifically for at least one of the following usage variants:

type of the vehicle, make of the vehicle, position of the vehicle door, user.

11. The control method according to claim 8, wherein the curve of the activation force and/or the curve of the pulling speed of the hand grip is ascertained throughout the movement of the hand grip under the action of the activation force.

12. The control method according to claim 8, wherein a movement duration is ascertained for the movement from the current position of the hand grip into the target position of the hand grip.

13. The control method according to claim 8, wherein an indicative position is moved to as the target position in order to output a visual and/or haptic signal.

14. The control method according to claim 8, wherein a movement of the hand grip that is detected as a signal input is produced by introducing an activation force.

15. A calibration method for calibrating an electric door handle for use in a control method having the features of claim 8, comprising the following steps:

detecting a position signal of a current position of the hand grip, determining a current position of the hand grip in relation to at least one of the first end position and the second end position, relating the current position signal to the determined current position of the hand grip.

16. The calibration method according to claim 15, wherein the current position is determined in at least one of the following ways:

using a checking means for immobilising the hand grip, camera images from a camera device fixed to the vehicle.

* * * * *